United States Patent [19]

Takada et al.

[11] Patent Number: 4,864,981

[45] Date of Patent: Sep. 12, 1989

[54] OVERHEAD VALVE TYPE ENGINE

[75] Inventors: Toshiyuki Takada, Miki; Hitoshi Yamamoto, Inami, both of Japan

[73] Assignee: Kawasaki Jukogyo Kabushiki Kaisha, Japan

[21] Appl. No.: 296,845

[22] Filed: Jan. 12, 1989

Related U.S. Application Data

[63] Continuation of Ser. No. 217,055, Jul. 8, 1988, abandoned, which is a continuation of Ser. No. 8,285, Jan. 29, 1987, abandoned.

[51] Int. Cl.$^4$ .............................................. F01L 1/02
[52] U.S. Cl. ............................. 123/90.27; 123/198 E; 123/195 HC
[58] Field of Search ........... 123/198 E, 195 C, 193 H, 123/2, 84, 41.69, 195 HC, 90.26, 90.27

[56] References Cited

U.S. PATENT DOCUMENTS

| | | | |
|---|---|---|---|
| 2,622,579 | 12/1952 | Weslake | 123/84 |
| 3,581,717 | 6/1971 | Fullerton | 123/41.69 |
| 3,841,278 | 10/1974 | Frehe | 123/41.69 |
| 3,949,727 | 4/1976 | Thien et al. | 123/198 E |
| 4,149,512 | 4/1979 | Hatz | 123/195 C |
| 4,438,733 | 3/1984 | Sasakai | 123/198 E |
| 4,494,490 | 1/1985 | Kiyooka et al. | 123/198 E |
| 4,595,841 | 6/1986 | Yaguchi | 123/2 |

*Primary Examiner*—Raymond A. Nelli

[57] ABSTRACT

An improved overhead valve internal combustion engine is disclosed in which an intake port defined in a cyclinder head for communication at its outlet side opening with a combustion chamber opens at its inlet end in a first side of the cylinder head for connection to a carburetor. An exhaust port also formed in the cylinder head for communication at its inlet side opening with the combustion chamber opens at its outlet end in a second side of the cylinder head that extends substantially perpendicular with the plane of the first side for connection through an exhaust duct to a muffler that is located on the opposite side of the cylinder head to the carburetor. This arrangement can enhance cooling of the cylinder and cylinder heads of an engine and miniturize engine overall size, without shortening the length of the exhaust duct connected between a muffler and exhaust port.

8 Claims, 2 Drawing Sheets

OVERHEAD VALVE TYPE ENGINE

This application is a continuation, of application Ser. No. 07/217,055, filed July 8, 1988, now abandoned, which is a continuation of application Ser. No. 07/008,285, filed Jan. 29, 1987, abandoned.

BACKGROUND OF THE INVENTION (1) Field of the Invention

This invention relates in general to an overhead valve type internal combustion engine and, in more particular, to the intake and exhaust system arrangement for such engines.

(2) Description of the Prior Art

Overhead valve type internal combustion engines characterized by their arrangements that the intake and exhaust valves are disposed in the top portion of the combustion chamber, are universally applied in rolling stock and other work vehicles for agriculture and public engineering.

Work vehicles normally employ general-purpose engines, which can be broadly classified into two groups depending on the disposition of the crankshaft. In the first group, the crankshaft is vertically suported with horizontally placed cylinders. Those belonging to the other group have their crankshafts horizontally arranged, with the cylinders being vertically held.

For application particularly in lawn mowers and mowing machines, vertical crankshaft types having their output shaft provided at a lower end thereof are more popular due to less overall engine height and the greater stability of the equipped machine.

In the cylinder heads of those conventional overhead valve type internal combustion engines, the inlet ports, which are connected to the carburetor and air cleaner, are bored at locations opposite the corresponding exhaust ports to which the exhaust duct and muffler are joined for exhaust gas emission.

A fan is generally mounted at the remotest end of the crankshaft from the output shaft, which is provided for cooling the cylinders and cylinderhead by supplying cooling air to them through an air duct.

A representative such engine is disclosed in U.S. Pat. No. 4,570,584.

However, those prior art overhead valve type engines have been found to pose problems. First, because of their designs that the inlet port is located opposite the exhaust port in the cylinder head, the bores themselves and their portions enclosing the push rods stand in the way of air streams from the cooling fan, so that no sufficient cooling of the cylinder head cannot be achieved.

Moreover, since insufficient cooling of a cylinder head tends to result in abnormal combustion problems such as knocking, the engine cannot enhance output and insure high fuel economy, one of the expected advantages of the overhead valve type internal combustion engine.

The valve guide is normally pressure fitted into the exhaust or intake valve bore and is usually made of iron since it is more likely to pose heat problems. In overhead valve type engines, the exhaust valve guides are normally mounted in the cylinder head on the crankshaft output side. Another problem with them is that great difficulty is encountered in cooling the exhaust valve guides in particular by a cooling fan. As result, exhaust valve guides, exposed to the high temperatures of exhaust gases, tend to slip out of places in the cylinder head, which are normally made of cast aluminum.

SUMMARY OF THE INVENTION

The present invention has been proposed to solve the drawback of the above-mentioned problems with the prior art.

It is therefore a primary objective of the present invention to provide an overhead valve type internal combustion engine which can provide for efficient cooling of its cylinder head so that engine performance and reliability can be greatly enhanced.

The above and other objectives, features and advantages of the present invention is accomplished by the cylinder head design that the intake port formed in the cylinder head has its outlet side opening with the combustion chamber that is substantially perpendicular with the side in which the intake port has its inlet opening, with the carburetor connected to the intake port being located on the opposite side of the cylinder head to the muffler connected through the exhaust duct to the exhaust port.

DETAILED DESCRIPTION OF PREFERRED EMBODIMENTS

The preferred embodiment of the present invention will be described in conjunction with the accompanying drawings.

Figure 1:
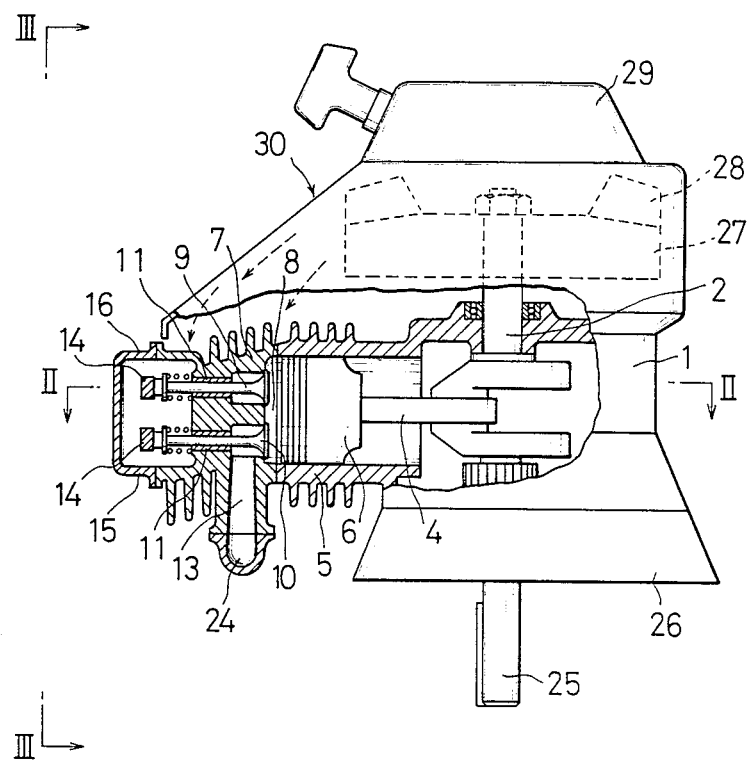
FIG. 1 is a side cross-sectional view of a preferred embodiment of the overhead type internal combustion engine according to the present invention.
Figure 2:
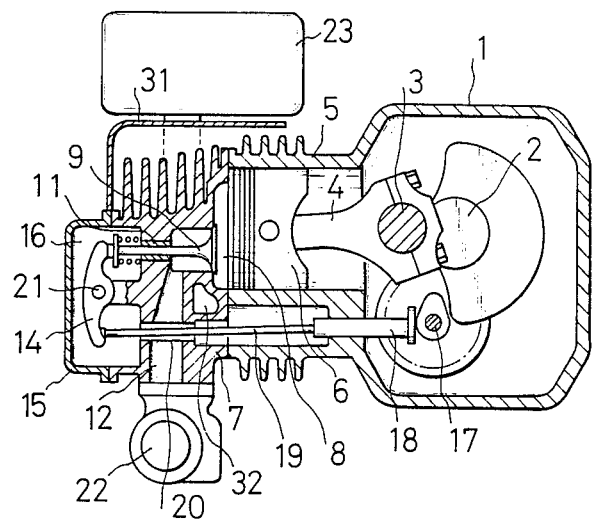
FIG. 2 is a cross-sectional view taken along the line II—II of FIG. 1.

Referring first FIGS. 1 and 2, which depict different views of an overhead valve type internal combustion engine with a vertically disposed crankshaft constructed in accordance with the present invention, a crankcase 1 is shown to carry a vertically disposed crankshaft 2, which is connected to a connecting rod 4 thorugh a crankpin 3. Connected to the other end of the connecting rod 4 is a reciprocating piston 6 that is movably inserted into a cylinder 5. In this particular embodiment, the cylinder 5 is disposed on a horizontal plane and made integral with the crankcase 1.

A cylinder head 7 is joined in airtight to the top surface of the cylinder 5 defining a combustion chamber 8 between the cylinder body and cylinder head 7. In the upper portion of the combustion chamber 8 are provided an intake valve 9 and an exhaust valve 10, which both are movably disposed to move against their respective valve seat in the same direction of movement of the piston 6. Each of the valves 9 and 10 is inserted into a valve guide 11, which may be pressure fitted in the cylinder head 7.

As shown in the drawing, an intake port 12 is formed in the cylinder head 7 to open at one end thereof into the combustion chamber 8 to supply it with fuel/air mixture. The intake port 12 is closed by the intake valve 9 which controls the supply of fuel/air mixtures to the combustion chamber 8. Also, an exhaust port 13 is defined to open into the combustion chamber 8 to permit discharge of exhaust gases generated as a result of combustion of a fuel/air mixture, controlled by the timed reciprocation of exhaust valve 10, shown below the intake valve 9 in the drawing.

As shown in FIGS. 1 and 2, the intake port 12 and exhaust port 13 are bored to extend in a direction substantially perpendicular with each other in the cylinder head 7.

In the cylinder head 7 are pivotally disposed a pair of rocker arms 14 which are connected to the intake and exhaust valves 9 and 10, respectively, as shown in FIG. 2, in such a manner that motion of the rocker arm 14 in one direction (clockwise, in the drawing in which the intake valve 9 alone is shown, although the description should also refer to the exhaust valve) causes the intake valve 9 to open against a return spring, which urges the intake valve 9 in a direction that closes it.

A cylinder head cover 15 is provided mounted on top of the cylinder head 7 enclosing the rocker arms 14 in a rocker arm chamber 16 defined between the cylinder head cover 15 and cylinder head 7.

Within the crankcase 1 is provided a camshaft 17 that extends parallelly with the crankshaft 2, which is driven to rotate at a rate twice the speed of the crankshaft 2. Connected to the camshaft 17 are a pair of valve drives each consisting of a cam, which is directly carried by the camshaft 17, a tappet 18 and a push rod 19 to reciprocate the intake and exhaust valves 9 and 10, respectively, in timing relationship with the rotation of the crankshaft 2 through their respective associated rocker arm 14.

Figure 3:
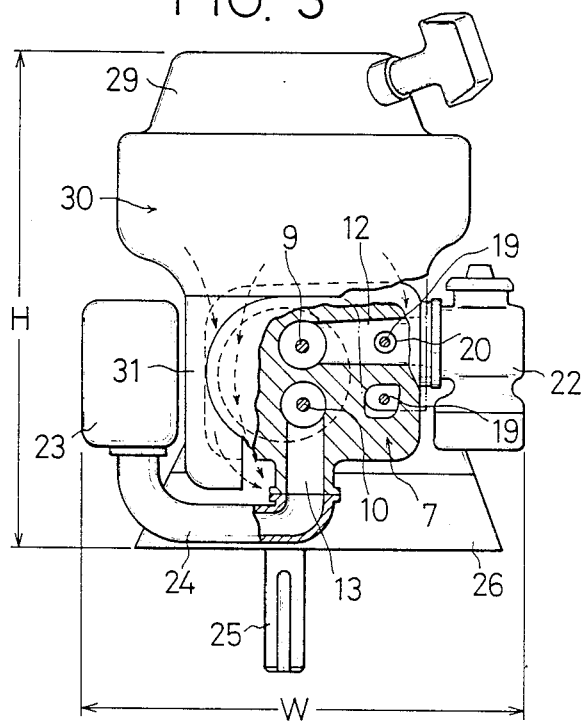
FIG. 3 is a cross-sectional view taken along the line III—III of FIG. 1.

In this particular embodiment, the push rods 19 are lined up parallelly with the exhaust port 13. Thus, the relative location of the valve drives to the valves allows one of the push rods 19, the one for the intake valve 9 as shown in FIG. 3, to extend right through the intake port 12. In order to protect the push rod 19 from exposure to the flow of fuel/air mixture passed through the intake port 12, the push rod 19 may preferably be encased in a hollow cylinder such as a pipe 20 whose hollow inside is large enough to permit free reciprocation of the push rod 19 but narrow enough not to cause obstruction to streams of fuel/air mixture through the intake port 12. Preferably, the pipe 20 may be pressure fitted in the cylinder head 7.

As a consequence of the location of the push rods 19 in the cylinder head 7, the rocker arms 14, along with rocker arm shaft 21, are located nearer the intake port 12 than the intake and exhaust valves 9 and 10, as illustrated in FIG. 2.

Connected to the intake port 12 is a carburetor 22 through an intake pipe (which is omitted in the drawing for brevity of illustration) to supply fuel/air mixture to the combustion chamber 8. The carburetor 22 is connected at its inlet side to an air cleaner (not shown).

As depicted in FIGS. 2 and 3, a muffler 23 is provided on the opposite side of the cylinder head 7 to the carburetor 22, which is connected to the exhaust port 13 through an exhaust duct 24.

An output shaft 25 is connected to the crankshaft 2 at the bottom side of the crankcase 1, which is placed on a base 26 for mounting on the floor of a work vehicle, to transmit engine torque to the road wheels of the vehicle through a transmission system. Owing to this arrangement, the exhaust port 13 is formed to open on the bottom side of the crankcase 1.

The crankshaft 2 protrudes above the top surface of the crankcase 1 for connection to a flywheel 27 and a cooling fan 28. In the embodiment shown, a combined flywheel with a cooling fan is employed in place of them. Also, a recoil starter 29 is provided for starting the engine.

A fan housing 30 is provided covering half part of the top surface of the crankcase 1 to enclose the cooling fan 28. The fan houseing 30 is constructed in such a manner as to guide the cooling air from the cooling fan 28 to flow along the surfaces of the cylinder 5 and cylinder head 7.

Furthermore, between the cylinder head 7 and muffler 23 is disposed a baffle 31 which directs cooling air from above to flow along the surfaces of the cylinder 5 and cylinder head 7 then downward along the bottom of the cylinder head 7 in the vicinity of the exhaust port 13.

The surfaces of the cylinder 5 and cylinder head 7 may preferably be shaped into fins, as shown in FIG. 1 and 2, to increase outside cooling surface.

This arrangement enables the cylinder head 7 to be formed on its side opposite the intake port 12 with a sufficiently corrugated fin centering around the valve guides 11 for the intake and exhaust valves 9 and 10 to provide for enhanced cooling, as shown in FIG. 2. Thus, the cooling air from the cooling fan 28 is allowed to flow smoothly in a desired direction, as indicated by the arrows in FIG. 3, cooling that part of the cylinder head 7 surfaces which encircling the valve guides 11 where proper cooling is most required. The baffle 31 helps guide the cooling air along a direction that further optimize cooling efficiency.

The side of the cylinder head 7 adjacent to the intake port 12 is far less exposed to cooling air, blocked by the push rod 19, in addition to physical impossibility to form a proper fin in the surface. However, this area is almost unlikely to cause heat problems and some degree of cooling is provided by the passage of fuel/air mixtures through the intake port 12. A cooling passage 32 opened to vertically run through the cylinder head 7, illustrated in FIG. 2, will suffice to provide effective cooling of the intake port 12.

With respect to FIG. 3, cooling air flowing around the left side of the cylinder head 7 will be allowed to move uninterrupted into the area below its bottom side so that the exhaust port 13, together with part of the exhaust duct 24, will be cooled. The baffle 31 will help enhance the cooling effect of the air flow thus directed. The air flow, after exposure to the heated exhaust port 13 by high-temperature gases flowing in its inside, is then permitted to exit downward.

In this particular embodiment, although the baffle 31 and the fan housing 30 are separate parts, this is a matter of choice and they may be built into a single component putting together their features.

It will be appreciated from the above that the present invention provides efficient cooling, in addition to the engine layout where uniform cooling can be obtainable.

Furthermore, since the cooling air, after increase in temperature through contact with the heated cylinder head 7 and other associated parts, is caused to leave the cylinder 5 on its exhaust port side, without flowing in the vicinity of the carburetor 22, problems such as percoration in the fuel system will be eliminated.

In addition, the layout of the intake port 12 extending perpendicular with the exhaust port 13 within the cylinder head 7, with the carburetor 22 connected to the intake port 12 on the opposite side of the cylinder 5 to the muffler 23 connected through the exhaust duct 24 to the exhaust port 13, as can best be illustrated in FIG. 3, enables both the width W and the height H of the engine to be reduced, contributing much to easing the mounting and handling of an overhead valve type internal combustion engine. It is important to note that minituarization can be achieved while insuring a sufficient length of the exhaust duct 24, as will be apparent from FIG. 3.

Furthermore, as can be best shown in FIG. 3, the intake and exhaust valves 9 and 10, together with their intake and exhaust ports 12 and 13, can be put to one side in the cylinder head 7 so that the engine designer can have the greater freedom in selecting the location and angle of the spark plug in a fairly wide space opposite the valves within the combustion chamber 8.

Although the above description refers to an internal combustion engine of the type in which the camshaft 17 is disposed within the crankcase 1, the present invention can also be applied to overhead camshaft engines having their camshafts encased in a rocker arm.

Furthermore, the present invention has been described with respect to a vertical crankshaft type of internal combustion engine with a horizontal cylinder. However, it should be understood that the invention is applicable for engines with tilted (V-type) or vertical cylinders as well.

Additionally, in the above description of the embodiment, although the exhaust port 13 and the exhaust duct 24 are each placed at right angles with respect to the axis of the crankshaft 2, as shown in FIG. 3, this is a matter of choice and they can take any angle of position, for example 45°, to the crankshaft.

What is claimed is:

1. In an overhead valve type internal combustion engine, the improvement wherein an intake passage defined in a cylinder head for communication at its outlet side opening with a combustion chamber opens at its inlet side in a first side of said cylinder head for connection to a carburetor, with an exhaust passage also formed to communicate at its inlet side opening with said combustion chamber, said outlet side opening and said inlet side opening with said combustion chamber open substantially at center portion of said cylinder head or near portion of said first side of said cylinder head, said exhaust passage opening at its inlet end in a second side of said cylinder head that extends substantially perpendicular with the plane of said first side for connection through an exhaust duct to a muffler that is situated on the opposite side of said cylinder head to said carburetor, said engine including a cooling fan mounted on the opposite side of said engine to said exhaust port, said cylinder head including push rods for driving intake and exhaust valves, said push rod for driving intake valve being mounted to extend through said intake passage in said cylinder head, said push rod for driving exhaust valve to extend through said cylinder head on said first side, and a spark plug that is installed in said combustion chamber on said muffler side of said cylinder head.

2. In an overhead valve type internal combustion engine, the improvement wherein an intake passage defined in a cylinder head for communication at its outlet side opening with a combustion chamber opens at its inlet side in a first side of said cylinder head for connection to a carburetor, with an exhaust passage also formed to communicate at its inlet side opening with said combustion chamber, said outlet side opening and said inlet side opening with said combustion chamber open substantially at center portion of said cylinder head or near portion of said first side of said cylinder head, said exhaust passage opening at its inlet end in a second side of said cylinder head that extends substantially perpendicular with the plane of said first side for connection through an exhaust duct to a muffler that is situated on the opposite side of said cylinder head to said carburetor, said engine including a cooling fan mounted on the opposite side of said engine to said exhaust port, a baffle mounted on the exit of said cooling fan is disposed along the surfaces of the cylinder and said cylinder head for extension to the bottom of said cylinder head in vicinity of said exhaust passage, said cylinder head including push rods for driving intake and exhaust valves, said push rod for driving intake valve being mounted to extend through said intake passage in said cylinder head, said push rod for driving exhaust valve to extend through said cylinder head on said first side, and a spark plug that is installed in said combustion chamber on said muffler side of said cylinder head.

3. In an overhead valve type internal combustion engine, the improvement wherein an intake passage defined in a cylinder head for communication at its outlet side opening with a combustion chamber opens at its inlet side in a first side of said cylinder head for connection to a carburetor, with an exhaust passage also formed to communicate at its inlet side opening with said combustion chamber, said outlet side opening and said inlet side opening with said combustion chamber open substantially at center portion of said cylinder head or near portion of said first side of said cylinder head, said exhaust passage opening at its inlet end in a second side of said cylinder head that extends substantially perpendicular with the plane of said first side for connection through an exhaust duct to a muffler that is situated on the opposite side of said cylinder head to said carburetor, said engine including a cooling fan mounted on the opposite side of said engine to said exhaust port, a baffle mounted on the exit of said cooling fan is disposed along the surfaces of said cylinder and said cylinder head for extension to the bottom of said cylinder head in vicinity of said exhaust passage, a cooling passage being mounted through said cylinder head to extend from said exit of said cooling fan to said second side of said cylinder head, said cylinder head including push rods for driving intake and exhaust valves, said push rod for driving intake valve being mounted to extend through said intake passage in said cylinder head, said push rod for driving exhaust valve to extend through said cylinder head on said first side, and a spark plug that is installed in said combustion chamber on said muffler side of said cylinder head.

4. The engine as set forth in claim 1, wherein a baffle mounted on the exit of said cooling fan is disposed along the surfaces of said cylinder and said cylinder head for extension to the bottom of said cylinder head in vicinity of said exhaust passage.

5. The engine as set forth in claim 1, wherein a cooling passage is mounted through said cylinder head to extend from the exit of said cooling fan to said second side of said cylinder head.

6. The engine as set forth in claim 1, wherein said baffle mounted on said exit of said cooling fan is disposed along said surfaces of said cylinder and said cylinder head for extension to said bottom of said cylinder head in vicinity of said exhaust passage, and said cooling passage being mounted through said cylinder head to extend from said exit of said cooling fan to said second side of said cylinder head.

7. In an overhead valve type internal combustion engine, the improvement wherein an intake passage defined in a cylinder head for communication at its outlet side opening with a combustion chamber opens at its inlet side in a first side of said cylinder head for connection to a carburetor, with an exhaust passage also formed to communicate at its inlet side opening with said combustion chamber, said outlet side opening and said inlet side opening with said combustion chamber open substantially at center portion of said cylinder head, said exhaust passage opening at its inlet end in a second side of said cylinder head that extends substantially perpendicular with the plane of said first side for connection through an exhaust duct to a muffler that is situated on the opposite side of said cylinder head to said carburetor, said engine including a cooling fan mounted on the opposite side of said engine to said exhaust port, and a baffle mounted on the exit of said cooling fan is disposed along the surfaces of the cylinder and said cylinder head for extension toward the bottom of said cylinder head in the vicinity of said exhaust passage, said cylinder head including push rods for driving intake and exhaust valves, said push rods being mounted to extend through said cylinder head on the first side.

8. The engine as set forth in claim 7, further including cooling passage means formed through the cylinder head to extend from the exit of the cooling fan to said second side of the cylinder head.

* * * * *